(No Model.) 2 Sheets—Sheet 2.
S. L. WIEGAND.
LAMP.
No. 267,626. Patented Nov. 14, 1882.
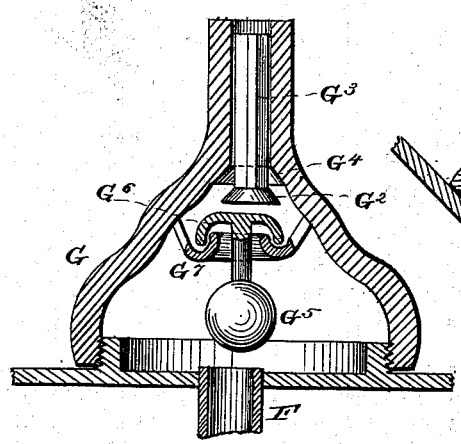
Fig. 6.
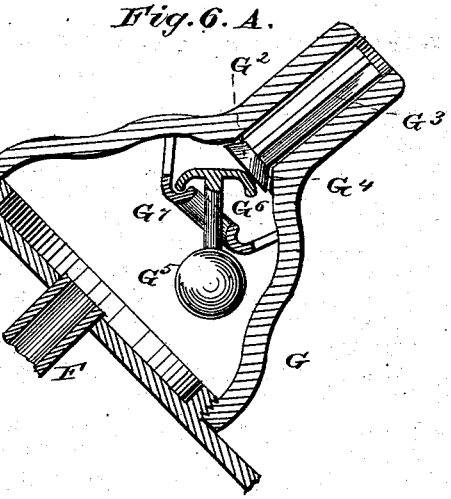
Fig. 6.A.
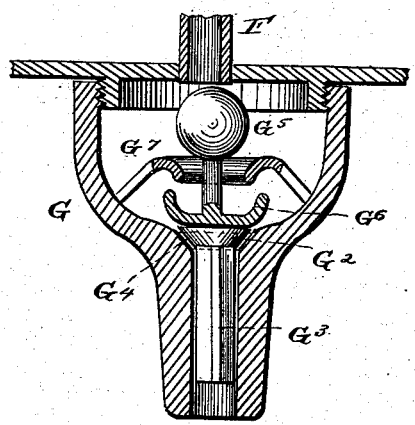
Fig. 6.B.
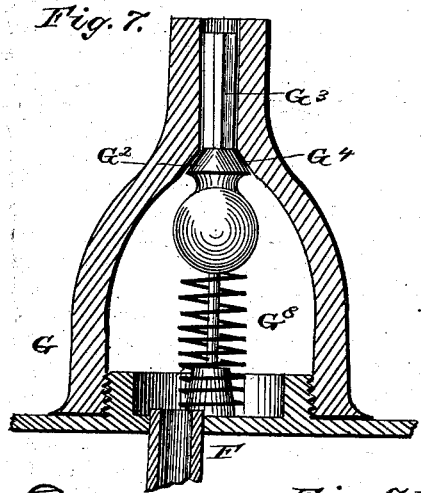
Fig. 7.
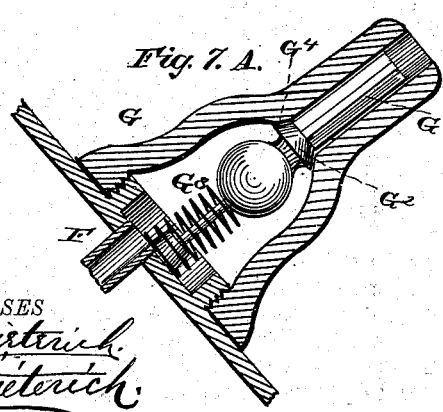
Fig. 7.A.
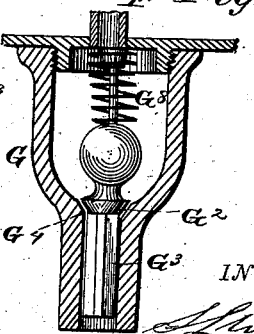
Fig. 7.B.
WITNESSES
INVENTOR

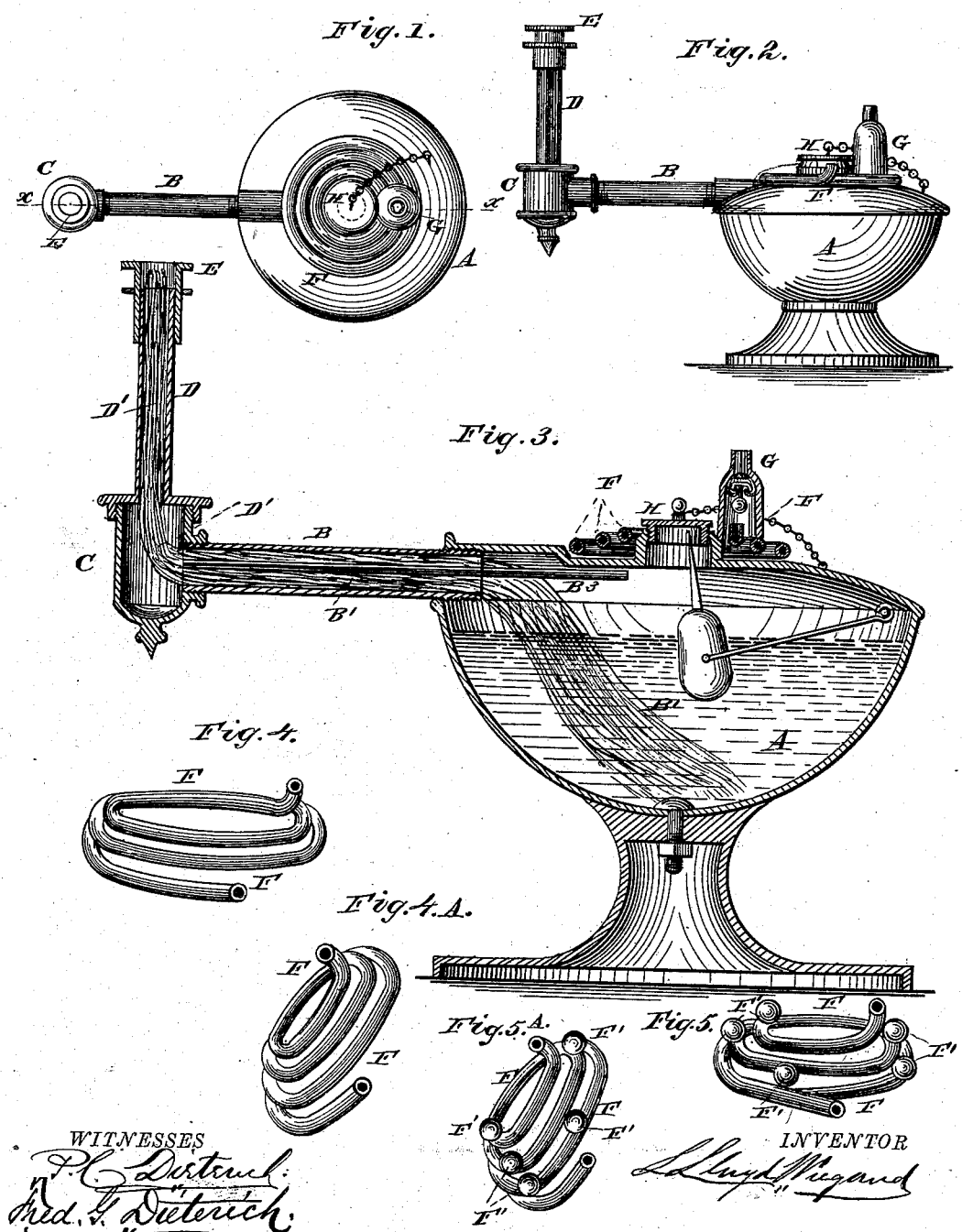

UNITED STATES PATENT OFFICE.

S. LLOYD WIEGAND, OF PHILADELPHIA, PENNSYLVANIA.

LAMP.

SPECIFICATION forming part of Letters Patent No. 267,626, dated November 14, 1882.

Application filed December 19, 1881. (No model.)

*To all whom it may concern:*

Be it known that I, S. LLOYD WIEGAND, of the city and county of Philadelphia, State of Pennsylvania, have invented a new and useful Improvement in Lamps; and I do hereby declare the following to be a sufficiently full, clear, and exact description thereof to enable others skilled in the art to make and use the said invention.

This invention relates to that class of lamps adapted to burn oils capable at ordinary temperature of emitting vapors of an inflammable character, and has for its object the prevention of accidental ignition of such vapors or the explosion thereof when mingled with air, steadiness of light, and convenience of form in constructing such lamps, so that they can be put up by screwed joint from detachable parts. They may thus be compactly packed for shipment, the parts being readily assembled for use by persons of slight mechanical skill.

The invention also has for its object at the same time to make a lamp of such form of operative parts as is better susceptible of ornamentation than others now used for such oils.

The nature of this invention consists in a lamp of such form that the body of the oil to be consumed is contained in a chamber not having any burner in contact with or contiguous to it, and conducting the oil horizontally or obliquely through a tube placed wholly or in part above the highest oil-level, by capillary attraction, to a wick-receptacle and burner, and conveying any vapors that may be formed in the wick-receptacle and a tube in excess of those required for the supply of the flame through the upper part of the same horizontal tube or conduit to such a point as shall permit them to be dispersed in the atmosphere without danger of ignition from the flame, the preferable place of discharge being in and through the oil receptacle or reservoir.

This invention further embraces novel devices for maintaining a free venting or communication of the oil-receptacle and vent from the wick-receptacle with the atmosphere, which shall close automatically when the lamp is inclined or overturned, said devices consisting essentially of a bent tube, forming a trap or series of traps when inclined, and in a valve guided so as to always move accurately to its seat by a weight or spring when the lamp is inclined or inverted. The oil and wick receptacles, being connected by a single tube effecting all the functions of an oil-conduit and vent-tube, are readily connected and secured together by screw-joints on the ends of such tube engaging in suitable threads in the oil and wick receptacles, and, requiring but a single tube for both purposes, are susceptible of forms of ornamentation impracticable where two separate tubes are employed to effect the connection of the oil and wick receptacles.

I will now proceed to describe fully and particularly the mode of making and using this invention, referring to the drawings annexed and letters of reference marked therein.

Figure 1 is a plan. Fig. 2 is a side elevation; Fig. 3, an enlarged vertical section in the plane indicated by the dotted line X X in Fig. 1. Figs. 4, 5, 6, and 7 show modifications of detail; and Figs. $4^A$, $5^A$, $6^A$, $6^B$, $7^A$, and $7^B$ show such details in different positions.

The same letters of reference apply to the same parts in the several figures.

A represents an oil receptacle or reservoir, in the upper part of which is screwed a tube, B, extending laterally therefrom to a wick-receptacle screwed thereon, having a burner-tube, D, and burner E. In the tube B is placed loosely a wick or other capillary conductor, B′, extending from the bottom of the oil-reservoir A to the wick-receptacle C, where it is united with the wick D′. The wick D′ is packed closely in the wick-tube D, but is loose at the lower end in the wick-receptacle C. The wick D′ may, in fact, be made in one piece with loose wick B′. The wick B′ should be placed so loosely in the tube B as to leave a space for air to pass over it to and from the oil-reservoir A and the wick-receptacle C. To more effectually secure this, a tube or guard of wire or plate metal, $B^3$, is fastened in the upper side of the tube B, so that in the event of the wick B′ being packed unnecessarily tight the air or vapor channel will be preserved above the wick B′.

On the upper part of the oil-reservoir A is placed a coiled tube, F, the lower end of which opens into the lamp, and the upper leads outward or upward to the air when the lamp stands upright, as shown in Fig. 4. This tube may be placed within the lamp-body instead of above it; but in either case this tube is entirely above the surface of and empty of oil; but when the lamp is inclined, so as to place the tube F in the position indicated in Fig. 4^A, the oil entering the tube F, resting in the coils thereof and inclosing air therein, forms a trap, cutting off communication with the atmosphere. This effect may be further promoted by forming in the pipe F, at intervals, enlargements F', as shown in Fig. 5, so that larger volumes of air must be displaced when the lamp is inclined than the amount of oil entering the first turn of the pipe F, thus effectually trapping the oil when the lamp is inclined, as shown in Fig. 5, by the greater quantities of air inclosed in the tube F between the expansions or chambers F'.

To more effectually guard against any accidental escape of oil through the vent, a valve, G, is attached, as shown in Fig. 6, consisting of a seat, $G^4$, a valve or plug, $G^2$, guided by wings $G^3$ to the seat $G^4$. The valve is closed when raised and is open when lowered. Underneath the valve $G^2$ is a pendulum, $G^5$, suspended by a button-shaped head, $G^6$, resting at its rim upon a ring or rim, $G^7$. When the lamp is inclined the pendulum, tending to retain its vertical position, assumes the position shown in Fig 6^A, and when inverted assumes the position shown in Fig. 6^B. A series of links and levers may be employed to connect the pendulum $G^5$ with the valve $G^2$, instead of the button-shaped head $G^6$ and ring $G^7$, with the same effect; but the latter device is preferred on account of its greater simplicity.

The valve $G^2$ and the seat $G^4$ and guide-wings $G^3$ may be operated by a spring, as shown in Fig. 7 and 7^A, the valve $G^2$ being of sufficient weight to overcome the force of the spring $G^8$ and open when in a vertical position, but closing by the reaction of the spring when inclined or inverted, as shown in Figs. 7^A and 7^B.

To use this lamp, oil—preferably of 76° or 78° Fahrenheit fire-test—is placed in the reservoir A by a filling screw-hole, H, and then closed and the burner E warmed and lighted, and a steady uniform light is produced until the oil in the reservoir is exhausted.

The tube F may be used without the valve G, or the valve G may be used without the tube F; but the degree of safety is lessened by dispensing with either.

The tube B and conductor B', oil-reservoir A, and wick-receptacle C may be used in conjunction with a separate vent applied to the wick-receptacle; but such an arrangement is less desirable than that shown herein, because of the increased complication of parts requisite to prevent escape of oil from the increased number of apertures.

I am aware that lamps have been made in which a branch of the oil-receptacle extended both above and below the level of the oil, said receptacle containing at its extremity a wick-receptacle; also, that carbureting attachments to gas-fixtures have been made wherein a wick extended from a reservoir of carbureting-fluid through the tube leading to the burner. Neither of these do I claim.

Having described my invention, what I claim therein is—

1. In a lamp for burning oils emitting inflammable vapors, the combination of an oil-reservoir and a remote wick-receptacle, united by a tube located above the level of the oil in the reservoir, adapted to contain a wick or other capillary conductor, substantially as and for the purpose set forth.

2. In a lamp for burning volatile oils, the combination of the wick-receptacle C and oil-receptacles A with the tube B, screwed thereto, and located above the oil-level, substantially as and for the purpose set forth.

3. In a lamp for burning volatile oils, having a burner remote horizontally from and above the oil-receptacle, the combination of the tube B with the guard $B^3$, for preserving the air and vapor conducting channel, substantially as and for the purpose set forth.

4. In a lamp for burning volatile oils, the combination of a wick-receptacle, C, oil-reservoir A, tube B, and capillary conductor B', as and for the purpose set forth.

5. In a lamp for burning oil emitting inflammable vapors, the combination of the coiled vent-tube F with the oil-reservoir A, arranged to operate substantially as and for the purpose set forth.

6. In a lamp for burning oil emitting inflammable vapors, the combination of the coiled vent-pipe F, having enlargements F', with the oil-reservoir A, substantially as and for the purpose set forth.

7. In a lamp for burning oil emitting inflammable vapors, the combination of the valve-seat $G^4$, and with the valve $G^2$, guided therein, and adapted to close automatically when the lamp is inverted or inclined, substantially as and for the purpose set forth.

8. In a lamp for burning oil emitting inflammable vapors, the combination of the valve-seat G', valve $G^2$, and pendulum $G^5$, arranged to automatically close said valve, as and for the purpose set forth.

S. LLOYD WIEGAND.

Witnesses:
LINN WHEELER,
J. DANIEL EBY.